United States Patent Office 2,976,325
Patented Mar. 21, 1961

2,976,325
SUBSTITUTED PHENOLIC SULFIDES

Samuel Wendell Long and Rodney D. Moss, Midland, Mich., assignors to The Dow Chemical Company, Midland, Mich., a corporation of Delaware No Drawing. Filed Nov. 17, 1958, Ser. No. 774,140

16 Claims. (Cl. 260—609)

The present invention is concerned with a method of making substituted phenolic sulfides and certain new substituted phenolic sulfides which are readily made by the process of this invention.

The process of the present invention includes contacting a phenol substituted with at least one of the members of the group consisting of halogen, nitro, alkyl, alkoxy, aralkyl, cylcoalkyl, and aryloxy, each carbon-containing radical containing up to 8 carbon atoms, inclusive, and having at least one of the ortho- and para-positions unsubstituted; with a halomethyl sulfide substituted with a member of the group consisting of alkyl, aralkyl, aryl, chloroaryl, and cycloalkyl groups containing up to 12 carbon atoms, inclusive, and wherein the halogen is chlorine or bromine. Equivalent amounts of reactants are generally used, although the ratio may be varied somewhat, if desired. The reaction may be carried out with or without a Friedel-Crafts catalyst, such as, for example, AlCl$_3$, ZnCl$_2$ or MgCl$_2$.

Temperatures from about 0° C. to about 110° C. are generally employed, and the temperature depends on the reactivity of the starting materials. Thus, in the reaction of o-chlorophenol with chlorodimethyl sulfide temperatures of 23° to 60° C. were employed. If desired, higher terminal temperatures may be employed to insure completion of the reaction. Atmospheric pressure is desirably used, although higher or lower pressures may be employed. A reaction time of from about 1 to about 4 hours is generally sufficient to obtain substantial completion of the reaction. The reaction products may be separated in any convenient manner, such as, for example, distillation, solvent extraction, or other means suitable for the phenolic sulfide.

Phenol starting materials which are suitable include, for example, 2,4-dichlorophenol, o-chlorophenol, o-bromophenol, 6-chloro-o-cresol, o-nitrophenol, o-fluorophenol, 4-chloro-2-cyclohexylphenol, 4-chloro-2-phenylphenol, 4-chloro-2-nitrophenol, 2-chloro-4-ethoxyphenol, 4-methoxy-2-nitrophenol, 2-cyclohexyl-4-nitrophenol, 4-nitro-2-phenylphenol, 6-nitro-o-cresol, o-cresol, p-methoxyphenol, 2-cyclohexyl-phenol, o-phenylphenol and the like.

Sulfide starting materials which are suitable include, for example, chlorodimethyl sulfide, bromodimethyl sulfide, (chloromethyl) ethyl sulfide, (chloromethyl) octyl sulfide, (chloromethyl) dodecyl sulfide, (chloromethyl) cyclohexyl sulfide, (chloromethyl) phenyl sulfide, (chloromethyl) p-chlorophenyl sulfide, (chloromethyl) p-tolyl sulfide, (chloromethyl) benzyl sulfide and the like.

The reaction of the present invention may be illustrated by the following equation:

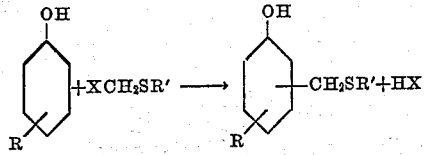

wherein R represents a member of the group consisting of halogen, nitro, alkyl, alkoxy, aralkyl, cycloalkyl, and aryloxy groups and wherein each carbon-containing radical may contain up to 8 carbon atoms, inclusive; X represents chlorine or bromine; and R' contains up to 12 carbon atoms and represents alkyl, aralkyl, aryl, chloroaryl and cycloalkyl groups.

When the phenol starting material is substituted with at least one halogen having an atomic weight of from 19 to 80, i.e., fluorine, chlorine or bromine; or a nitro group, new compounds are produced, such as, for example, 4,6-dichloro-α-(methylthio)-o-cresol, 2-chloro-α-(methylthio)-p-cresol, 6-chloro-α-(methylthio)-o-cresol, 2-bromo-α-(methylthio)-p-cresol, 6-bromo-α-(methylthio)-o-cresol, 6-chloro-α$^4$-(methylthio)-2,4-xylenol, (α-methylthio)-2-nitro-p-cresol, and (α-methylthio)-6-nitro-o-cresol. Thus, two classes of compounds within the present invention may be defined as α-(methylthio) nitro cresols, and α-(methylthio) halocresols wherein the halogen has an atomic weight of from 35 to 80. These new compounds are liquids or solids somewhat soluble in many organic solvents and of low solubility in water. These new compounds are useful as antioxidants, germicides, herbicides and seedicides and are particularly adapted to be employed as active toxic constituents of compositions for the control of the growth of emergent seeds and seedlings and aquatic plants. In a representative operation, 100 percent control of Marigold seed (Tagetes SPP) was obtained when the seeds were exposed to 6-chloro-α$^4$-(methylthio)-2,4-xylenol at a concentration of 100 parts per million of ultimate composition.

The following examples illustrate the invention but are not to be construed as limiting the invention thereto:

EXAMPLE I

*Preparation of α-(methylthio)-2-nitro-p-cresol and α-(methylthio)-6-nitro-o-cresol*

A 1-liter flask was charged with 48.3 grams (0.5 mole) of chlorodimethyl sulfide, 69.6 grams (0.5 mole) of o-nitrophenol, and 33.3 grams (0.25 mole) of anhydrous aluminum chloride. The mixture was stirred for 0.5 hour at 45° C. and then heated to 95° C. during the course of 2 hours. The reaction product was hydrolyzed by dumping into ice and warming to 40° C. The oil was separated and washed twice with water and the water layer extracted with methylene chloride. Distillation of the product at 0.2 millimeter of mercury pressure absolute resulted in the recovery of 37.5 grams of the mixed isomers of (α-methylthio)-2-nitro-p-cresol and (α-methylthio)-6-nitro-o-cresol, boiling at 98–100° C.

*Analysis.*—Calculate: S, 16.05 percent. Found: S, 15.9 percent.

EXAMPLE II

*4,6-dichloro-α-(methylthio)-o-cresol*

A 1-liter 3-necked flask equipped with a hinged glass stirrer, heating mantle, reflux condenser and dropping funnel was charged with 163 grams (1.0 mole) of 2,4-dichlorophenol. To this was added 96.5 grams (1.0 mole) of chlorodimethyl sulfide during an 80 minute period at a temperature of 28–40° C. The reaction was then heated to 100° C. with stirring during the next three hours. Fractional distillation of the resulting mixture yielded 53.5 grams of 4,6-dichloro-α-(methylthio)-o-cresol, boiling at 105–108° C. at 0.3 millimeter of mercury pressure absolute. Its index of refraction, N$_D^{25}$, is 1.6054. This represents a yield of 24 percent of the theoretical.

EXAMPLE III

*2-chloro-α-(methylthio)-p-cresol and 6-chloro-α-(methylthio)-o-cresol*

In a manner similar to Example I, 257 grams (2.0 moles) of o-chlorophenol were contacted with 193 grams (2.0 moles) of chlorodimethyl sulfide at 23–30° C. and stirred for 3 hours at 30° to 60° C. Fractional distillation yielded 213 grams of material boiling at 110 to 111° C. at 1.5 millimeters of mercury pressure absolute. This product was shown by infrared analysis to be a mixture of the isomeric 2-chloro-α-(methylthio)-p-cresol and 6-chloro-α-(methylthio)-o-cresol. Its refractive index, $N_D^{25}$ is 1.5994. This represents a yield of 57 percent of the theoretical.

*Analysis.*—Calculated: Cl, 18.9 percent; S, 17.0 percent. Found: Cl, 18.8 percent; S, 17.9 percent.

EXAMPLE IV

*2-bromo-α-(methylthio)-p-cresol and 6-bromo-α-(methylthio)-o-cresol*

In a manner similar to Example I, 86.5 grams (0.5 mole) of o-bromophenol were contacted with 48.25 grams (0.5 mole) of chlorodimethyl sulfide at 11° to 18° C. and then stirred at 30° to 110° C. for 85 minutes. Fractional distillation yielded 41.5 grams of a colorless oil boiling at 100–102° C. at 0.3 millimeter of mercury pressure absolute. This product was shown by infrared analysis to be a mixture of the isomeric 2-bromo-α-(methylthio)-p-cresol and 6-bromo-α-(methylthio)-o-cresol. Its refractive index, $N_D^{25}$ is 1.6211. This represents a yield of 18 percent of the theoretical.

*Analysis.*—Calculated: S, 13.71. Found: S, 13.57.

EXAMPLE V

*6-chloro-α⁴-(methylthio)-2,4-xylenol*

A solution of 142.5 grams (1.0 mole) of 6-chloro-o-cresol and 96.5 grams (1.0 mole) of chlorodimethyl sulfide was placed in a reaction vessel and 2.0 grams of anhydrous aluminum chloride added. An exothermic reaction occurred on heating to 30–40° C. The mixture was stirred at 30° to 90° C. for 4 hours, poured into about 200 milliliters of water, the organic layer separated and fractionally distilled. The 6-chloro-α⁴-(methylthio)-2,4-xylenol was collected at 100–108° C. at 0.4 to 1.0 millimeter of mercury pressure absolute. Its refractive index, $N_D^{25}$, is 1.5892. The yield was 92 grams, representing 45 percent of the theoretical.

*Analysis.*—Calculated: S, 15.9 percent. Found: S, 15.87 percent.

In a manner similar to that of the foregoing examples, other substituted phenolic sulfides may be prepared, such as, for example, 2-fluoro-α-(ethylthio)-p-cresol and 6-fluoro-α-(ethylthio)-o-cresol, by reacting o-fluorophenol with (chloromethyl) ethyl sulfide; 4-chloro-6-cyclohexyl-α-(methylthio)-o-cresol, by reacting 4-chloro-2-cyclohexylphenol with bromodimethyl sulfide; 4-chloro-6-phenyl-α-(octylthio)-o-cresol, by reacting 4-chloro-2-phenylphenol with (chloromethyl) octyl sulfide; 4-chloro-6-nitro-α-(dodecylthio)-o-cresol, by reacting 4-chloro-2-nitrophenol with (chloromethyl) dodecyl sulfide; 6-chloro-4-ethoxy-α-(cyclohexylthio)-o-cresol, by reacting 2-chloro-4-ethoxyphenol with (chloromethyl) cyclohexyl sulfide; 4-methoxy-6-nitro-α-(phenylthio)-o-cresol by reacting 4-methoxy-2-nitrophenol with (chloromethyl) phenylsulfide; 6-cyclohexyl-4-nitro-α-(p-chlorophenylthio)-o-cresol, by reacting 2-cyclohexyl-4-nitrophenol with (chloromethyl) p-chlorophenyl sulfide; 4-nitro-6-phenyl-α-(p-tolylthio)-o-cresol by reacting 4-nitro-2-phenylphenol with (chloromethyl) p-tolyl sulfide; 6-nitro-α⁴-(benzylthio)-2,4-xylenol, by reacting 6-nitro-o-cresol with (chloromethyl) benzyl sulfide; 6-tertiarybutyl-α-(benzylthio)-o-cresol and 2-tertiarybutyl-α-(benzylthio)-p-cresol, by reacting o-tertiary butylphenol with (bromomethyl) benzyl sulfide; 6-chloro-4-fluoro-α-(p-tolylthio)-o-cresol, by reacting 2-chloro-4-fluorophenol with (bromomethyl) p-tolyl sulfide; 4-chloro-6-nitro-α-(phenylthio)-o-cresol by reacting 4-chloro-2-nitrophenol, with (bromomethyl) phenyl sulfide; 6-bromo-4-fluoro-α-(cyclohexylthio)-o-cresol, by reacting 2-bromo-4-fluorophenol, with (bromomethyl) cyclohexyl sulfide; 6-bromo-4-nitro-α-(p-tertiarybutylphenylthio)-o-cresol, by reacting 2-bromo-4-nitrophenol with (bromomethyl) p-tertiarybutylphenyl sulfide; 3,4-dichloro-α-(methylthio)-o-cresol and 4,5-dichloro-α-(methylthio)-o-cresol, by reacting 3,4-dichlorophenol with bromodimethyl sulfide; 3,4,6-trichloro-α-(methylthio)-o-cresol, by reacting 2,4,5-trichlorophenol with (bromomethyl) ethyl sulfide; 6-chloro-4-tertiaryoctyl-α-(propylthio)-o-cresol, by reacting 2-chloro-4-tertiaryoctylphenol with (bromomethyl) propyl sulfide; 4,6-dinitro-α-(nonylthio)-o-cresol, by reacting 2,4-dinitrophenol with (bromomethyl) nonyl sulfide; 4,6-difluoro-α-(heptylthio)-o-cresol, by reacting 2,4-difluorophenol with (chloromethyl) heptyl sulfide; 4,6-dibromo-α-(p-tertiarybutylphenylthio)-o-cresol, by reacting 2,4-dibromophenol with (chloromethyl) p-tertiarybutylphenyl sulfide; 6-chloro-4-phenoxy-α-(p-dodecylphenylthio)-o-cresol, by reacting 2-chloro-4-phenoxyphenol with (chloromethyl) p-dodecylphenyl sulfide; 6-phenoxy-α-(p-octylphenylthio)-o-cresol and 2-phenoxy-α-(p-octylphenylthio)-p-cresol, by reacting o-phenoxyphenol with (chloromethyl) p-octylphenyl sulfide; 4-octyloxy-α-(hexylthio)-o-cresol, by reacting p-octyloxyphenol with (bromomethyl) hexyl sulfide; and 6-pentoxy-α-(butylthio)-o-cresol and 2-pentoxy-α-(butylthio)-p-cresol, by reacting o-pentoxyphenol with (bromomethyl) butyl sulfide.

Thus, the compounds of the present invention are phenolic sulfides having the formula

$$R-C_nH_{2n}S-R'$$

wherein R represents a halogen- or nitrosubstituted phenol which may have a lower alkyl, alkoxy, aralkyl, cycloalkyl or aryloxy group, wherein the carbon-containing radical may contain up to 8 carbon atoms, inclusive, on the benzene ring; and R' contains up to 12 carbon atoms inclusive, and represents a lower alkyl, cycloalkyl, aryl, aralkyl, or chloroaryl group.

Various modifications may be made in the present invention without departing from the spirit or scope thereof, and it is to be understood that we limit ourselves only as defined in the appended claims.

We claim:

1. A process for preparing phenolic sulfides which includes: contacting, at a temperature from about 0° C. to about 110° C., and under atmospheric pressure, o-nitrophenol with chlorodimethyl sulfide, and separating the α-(methylthio)-2-nitro-p-cresol and α-(methylthio)-6-nitro-o-cresol products.

2. A process for preparing phenolic sulfides which includes: contacting, at a temperature from about 0° C. to about 110° C., and under atmospheric pressure, o-chlorophenol with chlorodimethyl sulfide, and separating the 2-chloro-α-(methylthio)-p-cresol and 6-chloro-α-(methylthio)-o-cresol products.

3. A process for preparing phenolic sulfides which includes: contacting, at a temperature from about 0° C. to about 110° C., and under atmospheric pressure, o-bromophenol with chlorodimethyl sulfide, and separating the 2-bromo-α-(methylthio)-p-cresol and 6-bromo-α-(methylthio)-o-cresol products.

4. A process for preparing phenolic sulfides which includes: contacting, at a temperature from about 0° C. to about 110° C., and under atmospheric pressure, 2,4-dichlorophenol with chlorodimethyl sulfide, and separating the 4,6-dichloro-α-(methylthio)-o-cresol product.

5. A process for preparing phenolic sulfides which includes: contacting, at a temperature from about 0° C. to about 110° C., and under atmospheric pressure, 6-chloro-o-cresol with chlorodimethyl sulfide, and separating the 6-chloro-α⁴-(methylthio)-2,4-xylenol product.

6. α-(Methylthio)-2-nitro-p-cresol.

7. α-(Methylthio)-6-nitro-o-cresol.

8. 4,6-dichloro-α-(methylthio)-o-cresol.

9. 2-chloro-α-(methylthio)-p-cresol.

10. 6-chloro-α-(methylthio)-o-cresol.
11. 2-bromo-α-(methylthio)-p-cresol.
12. 6-bromo-α-(methylthio)-o-cresol.
13. 6-chloro-α⁴-(methylthio)-2,4-xylenol.
14. A compound having the formula

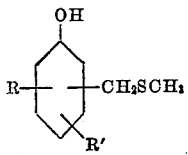

wherein R represents at least one member of the group consisting of chlorine, bromine and nitro radicals and in which R' represents a member of the group consisting of hydrogen and methyl radicals.

15. A compound in accordance with claim 14 wherein R is nitro and R' is hydrogen.
16. A compound in accordance with claim 14 wherein R is chlorine and R' is hydrogen.

References Cited in the file of this patent
UNITED STATES PATENTS

| | | |
|---|---|---|
| 2,417,118 | McCleary et al. | Mar. 11, 1947 |
| 2,488,134 | Mikeska | Nov. 15, 1949 |
| 2,526,755 | Kluge et al. | Oct. 24, 1950 |
| 2,668,768 | Chenicek | Feb. 9, 1954 |
| 2,831,030 | Chenicek | Apr. 15, 1958 |